United States Patent
Cahyadi et al.

(10) Patent No.: US 11,108,629 B1
(45) Date of Patent: Aug. 31, 2021

(54) DYNAMIC CONFIGURATION OF A CLUSTER NETWORK IN A VIRTUALIZED COMPUTING SYSTEM

(71) Applicant: VMware, Inc., Palo Alto, CA (US)

(72) Inventors: Yahya Cahyadi, San Jose, CA (US); George Gregory Hicken, San Francisco, CA (US); Ian Hunter Gann, Santa Clara, CA (US); Nanda Kishore Krishna, Santa Clara, CA (US); Harsh Kumar, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/838,739

(22) Filed: Apr. 2, 2020

(51) Int. Cl.
| | |
|---|---|
| *H04L 12/24* | (2006.01) |
| *G06F 9/455* | (2018.01) |
| *G06F 9/54* | (2006.01) |
| *H04L 12/46* | (2006.01) |

(52) U.S. Cl.
CPC ...... *H04L 41/0813* (2013.01); *G06F 9/45558* (2013.01); *G06F 9/547* (2013.01); *H04L 12/4641* (2013.01); *H04L 41/0806* (2013.01); *H04L 41/20* (2013.01); *G06F 2009/45595* (2013.01)

(58) Field of Classification Search
CPC ...... G06F 9/5077; G06F 9/45558; G06F 8/60; G06F 8/61; G06F 9/455; G06F 11/1484; G06F 8/70; G06F 9/44505; H04L 41/0803; H04L 45/38; H04L 45/586; H04L 45/64; H04L 67/10; H04L 67/34; H04L 41/12
See application file for complete search history.

(56) References Cited

U.S. PATENT DOCUMENTS

| | | |
|---|---|---|
| 2017/0371693 A1 | 12/2017 | Corrie et al. |
| 2021/0019196 A1* | 1/2021 | Geffin ............... G06F 9/5027 |
| 2021/0117241 A1* | 4/2021 | Xia .................. G06F 9/5072 |

OTHER PUBLICATIONS

Ernst, E. et al. "Kata Containers Architecture," GitHub, Inc., 2019, 22 pages, URL: https://github.com/kata-containers/documentation/blob/master/design/architecture.md.
Vmware, Inc. "Overview of vSphere Integrated Containers," Product version: 1.5, 2019, 21 pages.

* cited by examiner

*Primary Examiner* — Hitesh Patel
(74) *Attorney, Agent, or Firm* — Kim & Stewart LLP

(57) ABSTRACT

An example method of configuring a cluster network for an application management system having a cluster of virtual machines (VMs) is described. The VMs execute on a virtualization layer in a cluster of hosts connected to a physical network, the application management system integrated with the virtualization layer. The method includes: receiving, at a first master server, a request to assign network ports of the cluster network to control VMs of the VMs, the control VMs executing master servers of the application management system and having first network interfaces connected to a management network isolated from the cluster network; provisioning, by cooperation of the first master server with a network manager, the network ports of the cluster network; and reconfiguring, by cooperation of the first master server with a virtualization management server, the control VMs with second network interfaces connected to the network ports of the cluster network.

20 Claims, 9 Drawing Sheets

_US 11,108,629 B1_

DYNAMIC CONFIGURATION OF A CLUSTER NETWORK IN A VIRTUALIZED COMPUTING SYSTEM

Applications today are deployed onto a combination of virtual machines (VMs), containers, application services, and more. For deploying such applications, a container orchestration platform known as Kubernetes® has gained in popularity among application developers. Kubernetes provides a platform for automating deployment, scaling, and operations of application containers across clusters of hosts. It offers flexibility in application development and offers several useful tools for scaling.

In a Kubernetes system, containers are grouped into logical unit called "pods" that execute on nodes. Containers in the same pod share the same resources and network and maintain a degree of isolation from containers in other pods. The pods are distributed across nodes of the Kubernetes system that form a node cluster. A cluster network for the node cluster facilitates container-to-container, pod-to-pod, pod-to-service, and external-to-service communications.

In a conventional Kubernetes system, each node comprises a host operating system (OS), such as Linux®, executing on a hardware platform. A container engine (e.g., Docker®) executes on the host OS, which supports the containers of the pods. Thus, a node includes multiple containers and control plane components executing on a shared OS. The cluster network is implemented using a physical network connecting the nodes directly or through external virtualization (e.g., virtual local area networks (VLANs)). Such a configuration results in security and isolation risks, since a single container can consume all the resources of the node, starving other containers for resources. Further, a vulnerability in one container can escape the container and infect other containers or control plane components running on the shared OS. A Kubernetes system can operate on a virtualized computing system in various configurations that mitigate security and isolation risks of the shared host OS. However, the cluster network in such virtualized configurations is typically implemented using more complex software-defined (SD) network systems that provide software abstractions of layer-2 to layer-7 network services. It is desirable to provide dynamic configuration of the cluster network in a virtualized computing system having such an SD network system.

SUMMARY

In an embodiment, a method of configuring a cluster network for an application management system having a cluster of virtual machines (VMs) is described. The VMs execute on a virtualization layer in a cluster of hosts connected to a physical network, the application management system integrated with the virtualization layer. The method includes: receiving, at a first master server, a request to assign network ports of the cluster network to control VMs of the VMs, the control VMs executing master servers of the application management system including the first master server, the control VMs having first network interfaces connected to a management network isolated from the cluster network; provisioning, by cooperation of the first master server with a network manager connected to the management network, the network ports of the cluster network; and reconfiguring, by cooperation of the first master server with a virtualization management server connected to the management network, the control VMs with second network interfaces connected to the network ports of the cluster network.

Further embodiments include a non-transitory computer-readable storage medium comprising instructions that cause a computer system to carry out the above methods, as well as a computer system configured to carry out the above methods.

DETAILED DESCRIPTION

Figure 1:
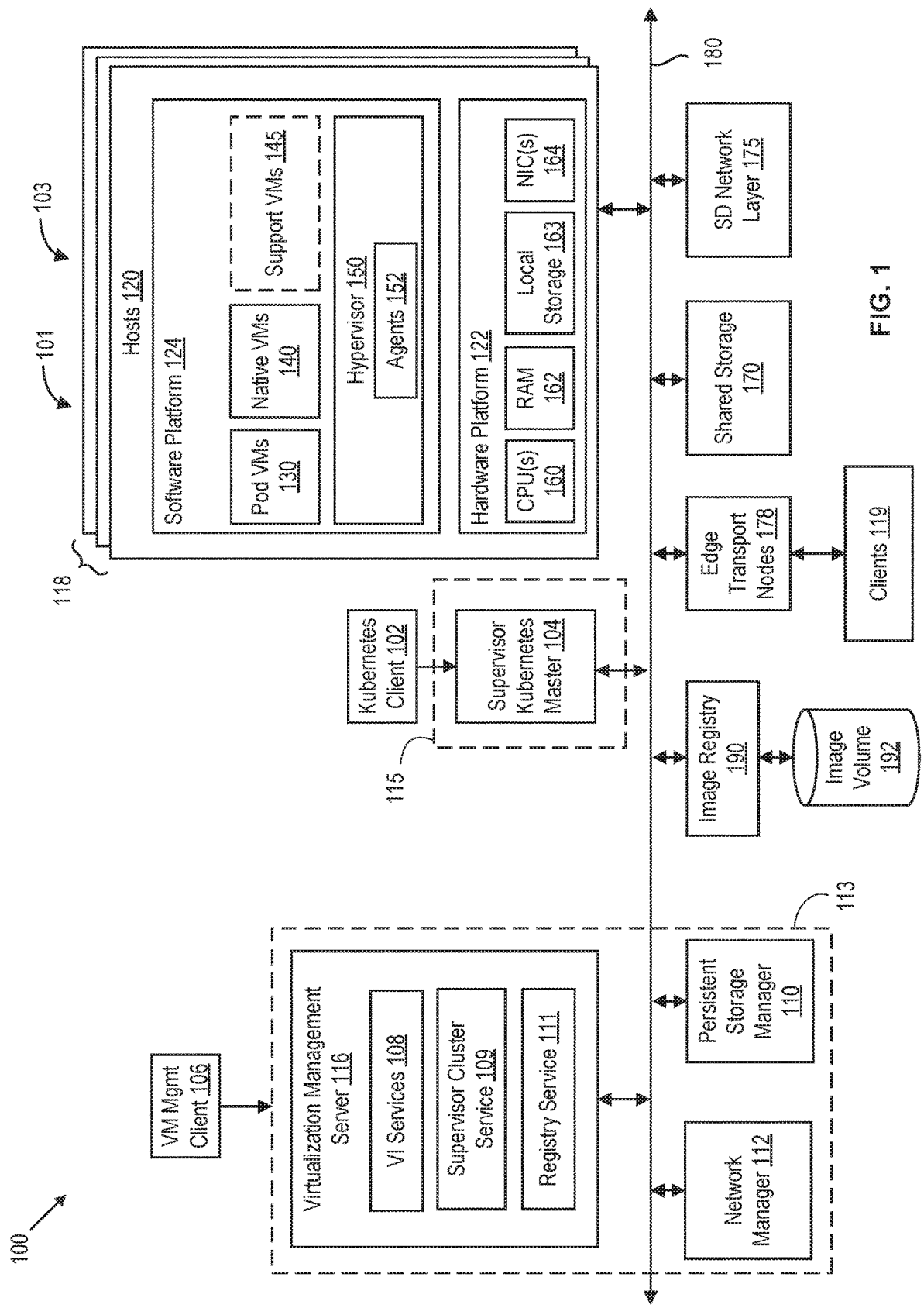
FIG. 1 is a block diagram of a virtualized computing system in which embodiments described herein may be implemented.

Techniques for dynamic configuration of a cluster network in a virtualized computing system are described. In embodiments described herein, the virtualized computing system includes a cluster of physical servers ("hosts") referred to as a "host cluster." The host cluster includes a virtualization layer, executing on hardware platforms of the hosts, which supports execution of virtual machines (VMs). A virtualization management server manages the host cluster, the virtualization layer, and the VMs executing thereon. The host cluster further includes a software-defined (SD) network layer. SD network provides a set of network services in software, including switching, routing, firewalling, load balancing, quality of service (oS), and the like. SD network supports provisioning of logical networks that support communication between VMs in a host, between VMs across hosts, and between VMs and external networks. A network manager manages the SD network layer for the host cluster, sometimes in cooperation with the virtualization management server. Together, the virtualization management server and the network manager form a virtual infrastructure (VI) control plane of the virtualized computing system. The host cluster (or multiple host clusters) and the VI control plane comprise a software-defined data center (SDDC).

In embodiments, the SDDC includes an orchestration control plane that orchestrates compute, network, and storage for an application management system, such as Kubernetes. The orchestration control plane includes components integrated with the virtualization management server and the virtualization layer to enable the host cluster as a "supervisor cluster." The orchestration control plane further includes components that interface the Kubernetes system with the underlying SDDC infrastructure. In a supervisor cluster, the orchestration control plane uses hosts to implement nodes, and VMs to implement pods, of a Kubernetes system. Kubernetes pods are implemented as "pod VMs," each of which includes a kernel and container engine that supports execution of containers. The supervisor cluster uses the SD network layer of the SDDC to provide a cluster network for the Kubernetes system.

In embodiments, the orchestration control plane dynamically configures the cluster network for the Kubernetes system during deployment of control VMs that implement the master servers of the Kubernetes system. When a VI admin enables a host cluster as a supervisor cluster, a service in the virtualization management server deploys orchestration control plane components, including components in the virtualization layer and components executing in control VMs. The control VMs include Kubernetes components (e.g., a Kubernetes application programming interface (API) server and scheduler) and custom orchestration control plane components (e.g., custom controllers and plugins) that function together as a cluster of master servers.

Upon initial deployment of the control VMs, the cluster network is unconfigured or is non-existent. The control VMs are connected to an isolated management network, which is implemented using external virtualization on the physical network (e.g., using a dedicated virtual local area network (VLAN)). In embodiments, the management network is not accessible by users of the Kubernetes system. The management network, however, supports communication between the master server cluster and the VI control plane. This allows a network plugin executing in a master server, in cooperation with the network manager, to deploy and configure a cluster network for the Kubernetes system in the SD network layer. As a part of this configuration, the network plugin connects the cluster network to edge nodes that support external ingress/egress for the cluster network. As a further part of this configuration, the network plugin provisions network ports in guest cluster for the control VMs, and the virtualization management server adds network interfaces to the control VMs to connect them to the cluster network. This allows users to access the master server cluster through an external network. These and further advantages and aspects of the disclosed techniques are described below with respect to the drawings.

FIG. 1 is a block diagram of a virtualized computing system 100 in which embodiments described herein may be implemented. System 100 includes a cluster of hosts 120 ("host cluster 118") that may be constructed on server-grade hardware platforms such as an x86 architecture platforms. For purposes of clarity, only one host cluster 118 is shown. However, virtualized computing system 100 can include many of such host clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 180. Physical network 180 enables communication between hosts 120 and between other components and hosts 120 (other components discussed further herein). Physical network 180 can include a plurality of VLANs to provide external network virtualization as described further herein.

In the embodiment illustrated in FIG. 1, hosts 120 access shared storage 170 by using NICs 164 to connect to network 180. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks, flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN, which is another form of shared storage 170.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) may be concurrently instantiated and executed. One example of hypervisor 150 that may be configured and used in embodiments described herein is a VMware ESXi™ hypervisor provided as part of the VMware vSphere@ solution made commercially available by VMware, Inc. of Palo Alto, Calif. In the example of FIG. 1, host cluster 118 is enabled as a "supervisor cluster," described further herein, and thus VMs executing on each host 120 include pod VMs 130 and native VMs 140. Some VMs 130/140, shown as support VMs 145, have specific functions within host cluster 118. For example, support VMs 145 can provide control plane functions, edge transport functions, and the like. An embodiment of software platform 124 is discussed further below with respect to FIG. 2.

Host cluster 118 is configured with a software-defined (SD) network layer 175. SD network layer 175 includes logical network services executing on virtualized infrastructure in host cluster 118. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches, logical routers, logical firewalls, logical virtual private networks (VPNs), logical load balancers, and the like, implemented on top of the virtualized infrastructure. In embodiments, virtualized computing system 100 includes edge transport nodes 178 that provide an interface of host cluster 118 to an external network (e.g., a corporate network, the public Internet, etc.). Edge transport nodes 178 can include a gateway between the internal logical networking of host cluster 118 and the external network. Edge transport nodes 178 can be physical servers or VMs. For example, edge transport nodes 178 can be implemented in support VMs 145 and include a gateway of SD network layer 175. Various clients 119 can access service(s) in virtualized computing system through edge transport nodes 178 (including VM management client 106 and Kubernetes client 102, which as logically shown as being separate by way of example).

Virtualization management server 116 is a physical or virtual server that manages host cluster 118 and the virtualization layer therein. Virtualization management server 116 installs agent(s) 152 in hypervisor 150 to add a host 120 as a managed entity. Virtualization management server 116 logically groups hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 118.

In an embodiment, virtualization management server 116 further enables host cluster 118 as a supervisor cluster 101. Virtualization management server 116 installs additional agents 152 in hypervisor 150 to add host 120 to supervisor cluster 101. Supervisor cluster 101 integrates an orchestration control plane 115 with host cluster 118. In embodiments, orchestration control plane 115 includes software components support an application management system, such as a Kubernetes system, on top of host cluster 118. By way of example, a Kubernetes system is described herein. In supervisor cluster 101, hosts 120 become nodes of the Kubernetes system. Virtualization management server 116 provisions one or more control VMs as "master servers." A control VM includes a guest operating system and guest software executing thereon that provides control functions of orchestration control plane 115. In embodiments, control VMs function as management entities and execute on control nodes of the Kubernetes system (e.g., Kubernetes master servers). In the embodiment of FIG. 1, supervisor cluster 101 includes a supervisor Kubernetes master 104 that functions as such a master server. For purposes of clarity, supervisor Kubernetes master 104 is shown as a separate logical entity. For practical implementations, supervisor Kubernetes master 104 can be implemented as one or more VM(s) 130/140 in host cluster 118. Further, although only one supervisor Kubernetes master 104 is shown, supervisor cluster 101 can include more than one supervisor Kubernetes master 104 in a logical cluster for redundancy and load balancing. Orchestration control plane 115 includes custom controllers, custom plugins, scheduler extenders, and the like executing in supervisor Kubernetes master 104, as well as services executing in the VI control plane, which together enable the Kubernetes system to deploy applications on VMs 130/140 of host cluster 118.

In an embodiment, virtualized computing system 100 further includes a persistent storage manager 110. Persistent storage manager 110 is a physical or virtual server that provisions virtual disks in shared storage 170 (including a virtual SAN formed from local storage 163) as independent and persistent volumes. That is, virtual disks that persist apart from the lifecycle of any VM or container. Various components can interact with persistent storage manager 110 to provision persistent volumes, such as virtualization management server 116 and supervisor Kubernetes master 104. Persistent storage manager 110 can operate independently from virtualization management server 116 (e.g., as an independent physical or virtual server). Alternatively, persistent storage manager 110 can be a service in virtualization management server 116.

In an embodiment, virtualized computing system 100 further includes a network manager 112. Network manager 112 is a physical or virtual server that orchestrates SD network layer 175. In an embodiment, network manager 112 comprises one or more virtual servers deployed as VMs. Network manager 112 installs additional agents 152 in hypervisor 150 to add a host 120 as a managed entity, referred to as a transport node. In this manner, host cluster 118 can be a cluster 103 of transport nodes One example of an SD networking platform that can be configured and used in embodiments described herein as network manager 112 and SD network layer 175 is a VMware NSX@ platform made commercially available by VMware, Inc. of Palo Alto, Calif.

Network manager 112 can deploy one or more transport zones in virtualized computing system 100, including VLAN transport zone(s) and an overlay transport zone. A VLAN transport zone spans a set of hosts 120 (e.g., host cluster 118) and is backed by external network virtualization of physical network 180 (e.g., a VLAN). One example VLAN transport zone enables a management network connecting hosts 120 and the VI control plane (e.g., virtualization management server 116, network manager 112, and persistent storage manager 110). An overlay transport zone spans a set of hosts 120 (e.g., host cluster 118) and provides internal network virtualization using software components (e.g., the virtualization layer and services executing in VMs). Host-to-host traffic for the overlay transport zone is carried by physical network 180 using layer-2-over-layer-3 tunnels. The overlay transport zone supports an overlay network (e.g., a cluster network for supervisor cluster 101). The overlay transport zone can be extended into at least one of edge transport nodes 178 to provide ingress/egress between the overlay network and an external network.

In an embodiment, system 100 further includes an image registry 190 and an image volume 192. As described herein, containers of supervisor cluster 101 execute in pod VMs 130. The containers in pod VMs 130 are spun up from container images managed by image registry 190. Image registry 190 manages images and image repositories stored on an image volume 192. Image volume 192 includes persistent storage provisioned from shared storage 170 for storing container images and container repositories.

Virtualization management server 116, network manager 112, and persistent storage manager 110 comprise a virtual infrastructure (VI) control plane 113 for host cluster 118, shared storage 170, and SD network layer 175. Virtualization management server 116 can supervisor cluster service 109, registry service 111, and VI services 108. VI services 108 include various virtualization management services, such as a distributed resource scheduler (DRS), high-availability (HA) service, single sign-on (SSO) service, virtualization management daemon, and the like. DRS is configured to aggregate the resources of host cluster 118 to provide resource pools and enforce resource allocation policies. DRS also provides resource management in the form of load balancing, power management, VM placement, and the like. HA service is configured to pool VMs and hosts into a monitored cluster and, in the event of a failure, restart VMs on alternate hosts in the cluster. A single host is elected as a master, which communicates with the HA service and monitors the state of protected VMs on subordinate hosts. The HA service uses admission control to ensure sufficient resources are reserved in the cluster for VM recovery when a host fails. SSO service comprises security token service, administration server, directory service, identity management service, and the like configured to implement an SSO platform for authenticating users. The virtualization management daemon is configured to manage objects, such as data centers, clusters, hosts, VMs, resource pools, datastores, and the like.

Supervisor cluster service 109 enables host cluster 118 as supervisor cluster 101. Supervisor cluster service 109 deploys the components of orchestration control plane 115. Registry service 111 administers image registry 190. Registry service 111 is configured to perform lifecycle management of image registry 190, lifecycle management of projects, image registry health monitoring, project and image statistic collection, project and image replication, and the like.

A VI admin can interact with virtualization management server 116 through a VM management client 106. Through VM management client 106, a VI admin commands virtualization management server 116 to form host cluster 118, configure resource pools, resource allocation policies, and other cluster-level functions, configure storage and networking, enable supervisor cluster 101, deploy and manage image registry 190, and the like.

Kubernetes client 102 represents an input interface for a user to supervisor Kubernetes master 104. Kubernetes client 102 is commonly referred to as kubectl. Through Kubernetes client 102, a user submits desired states of the Kubernetes system, e.g., as YAML documents, to supervisor Kubernetes master 104. In embodiments, the user submits the desired states within the scope of a supervisor namespace. A "supervisor namespace" is a shared abstraction between VI control plane 113 and orchestration control plane 115. Each supervisor namespace provides resource-constrained and authorization-constrained units of multi-tenancy. A supervisor namespace provides resource constraints, user-access constraints, and policies (e.g., storage policies, network policies, etc.). Resource constraints can be expressed as quotas, limits, and the like with respect to compute (CPU and memory), storage, and networking of the virtualized infrastructure (host cluster 118, shared storage 170, SD network layer 175). User-access constraints include definitions of users, roles, permissions, bindings of roles to users, and the like. Each supervisor namespace is expressed within orchestration control plane 115 using a namespace native to orchestration control plane 115 (e.g., a Kubernetes namespace or generally a "native namespace"), which allows users to deploy applications in supervisor cluster 101 within the scope of supervisor namespaces. In this manner, the user interacts with supervisor Kubernetes master 104 to deploy applications in supervisor cluster 101 within defined supervisor namespaces.

Figure 2:
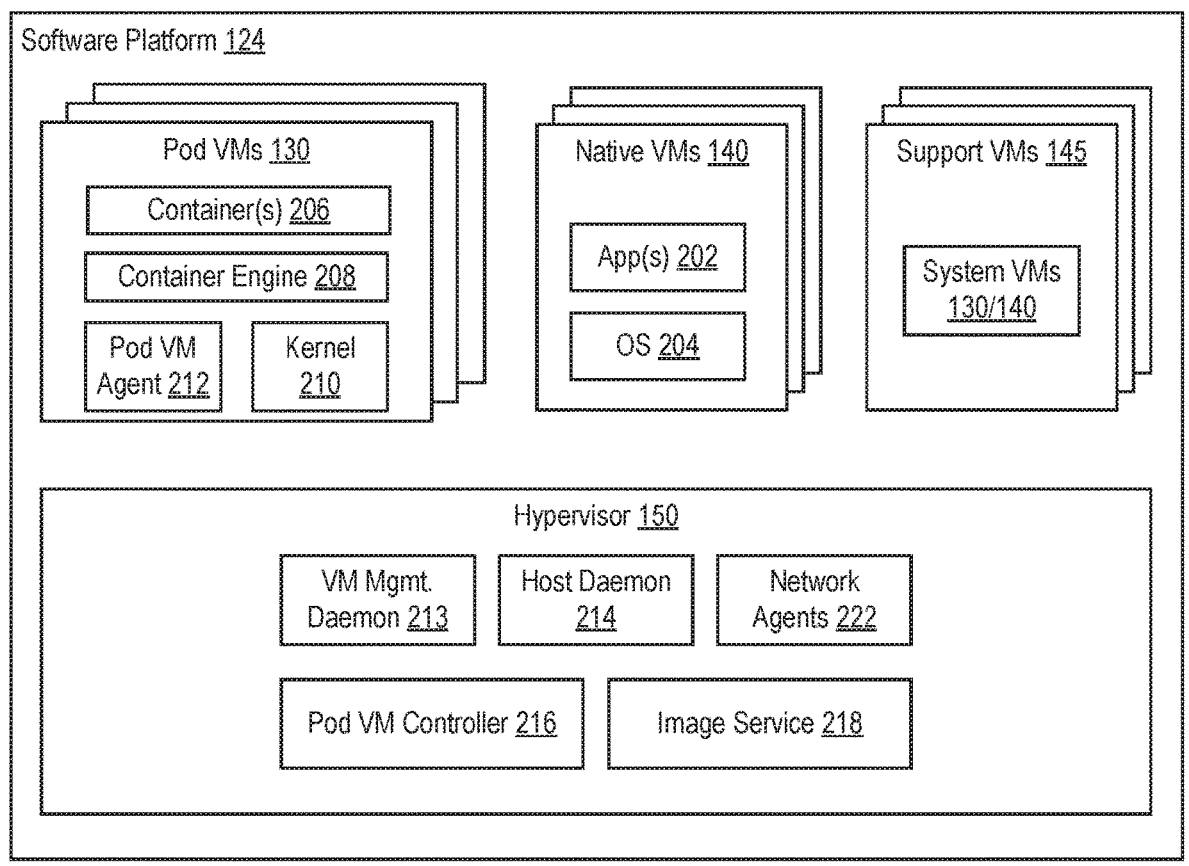
FIG. 2 is a block diagram depicting a software platform according an embodiment.

FIG. 2 is a block diagram depicting software platform 124 according an embodiment. As described above, software platform 124 of host 120 includes hypervisor 150 that supports execution of VMs, such as pod VMs 130, native VMs 140, and support VMs 145. In an embodiment, hypervisor 150 includes a VM management daemon 213, a host daemon 214, a pod N controller 216, an image service 218, and network agents 222. NM management daemon 213 is an agent 152 installed by virtualization management server 116. VM management daemon 213 provides an interface to host daemon 214 for virtualization management server 116. Host daemon 214 is configured to create, configure, and remove VMs (e.g., pod VMs 130 and native VMs 140).

Pod VM controller 216 is an agent 152 of orchestration control plane 115 for supervisor cluster 101 and allows supervisor Kubernetes master 104 to interact with hypervisor 150. Pod VM controller 216 configures the respective host as a node in supervisor cluster 101. Pod VM controller 216 manages the lifecycle of pod VMs 130, such as determining when to spin-up or delete a pod VM. Pod VM controller 216 also ensures that any pod dependencies, such as container images, networks, and volumes are available and correctly configured. Pod VM controller 216 is omitted if host cluster 118 is not enabled as a supervisor cluster 101.

Image service 218 is configured to pull container images from image registry 190 and store them in shared storage 170 such that the container images can be mounted by pod VMs 130. Image service 218 is also responsible for managing the storage available for container images within shared storage 170. This includes managing authentication with image registry 190, assuring providence of container images by verifying signatures, updating container images when necessary, and garbage collecting unused container images. Image service 218 communicates with pod VM controller 216 during spin-up and configuration of pod VMs 130. In some embodiments, image service 218 is part of pod VM controller 216. In embodiments, image service 218 utilizes system VMs 130/140 in support VMs 145 to fetch images, convert images to container image virtual disks, and cache container image virtual disks in shared storage 170.

Network agents 222 comprises agents 152 installed by network manager 112. Network agents 222 are configured to cooperate with network manager 112 to implement logical network services. Network agents 222 configure the respective host as a transport node in a cluster 103 of transport nodes.

Each pod VM 130 has one or more containers 206 running therein in an execution space managed by container engine 208. The lifecycle of containers 206 is managed by pod VM agent 212. Both container engine 208 and pod VM agent 212 execute on top of a kernel 210 (e.g., a Linux kernel). Each native VM 140 has applications 202 running therein on top of an OS 204. Native VMs 140 do not include pod VM agents and are isolated from pod VM controller 216. Container engine 208 can be an industry-standard container engine, such as libcontainer, runc, or containerd. Pod VMs 130 are omitted if host cluster 118 is not enabled as a supervisor cluster 101.

Figure 3:
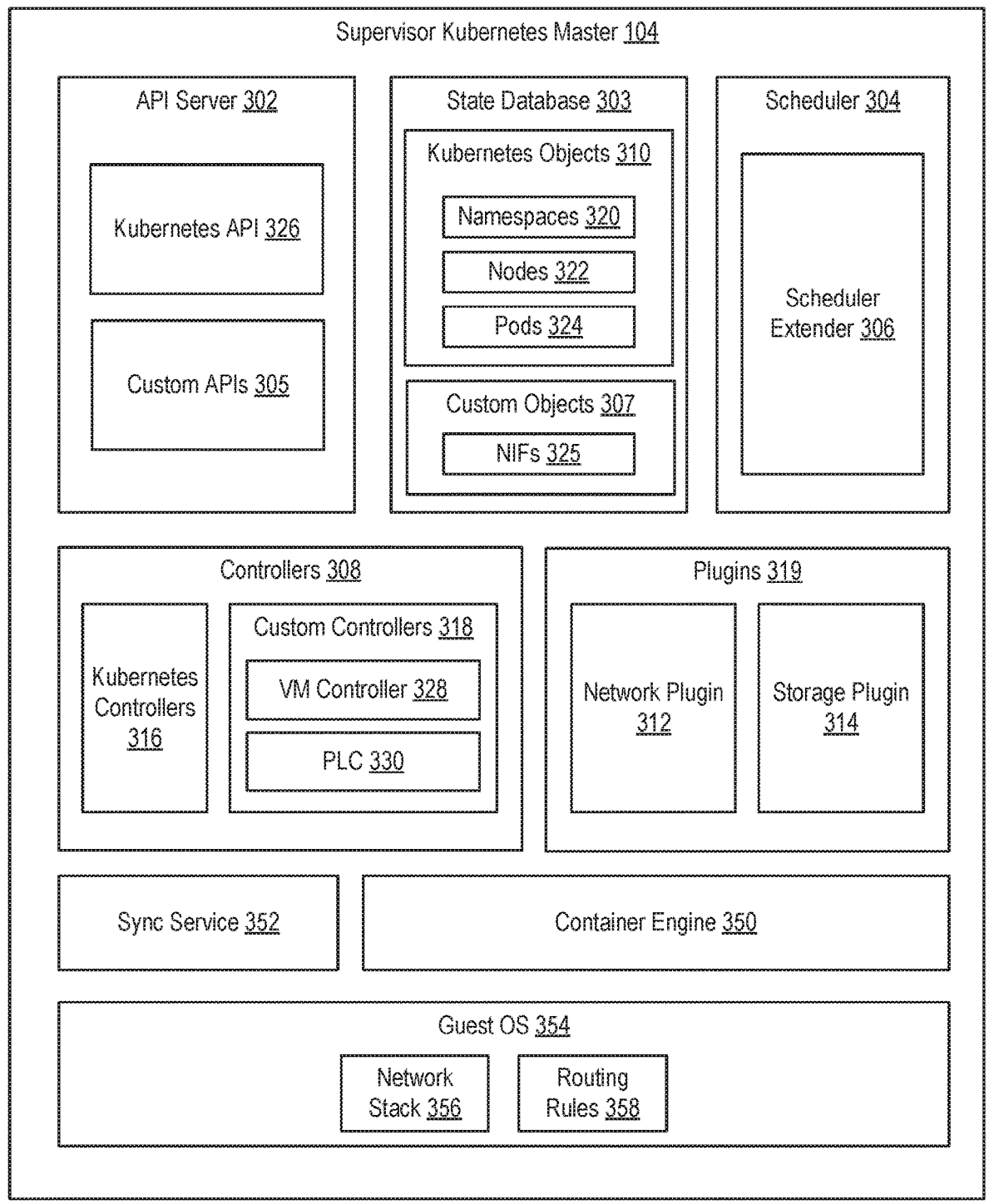
FIG. 3 is a block diagram of a supervisor Kubernetes master according to an embodiment.

FIG. 3 is a block diagram of supervisor Kubernetes master 104 according to an embodiment. Supervisor Kubernetes master 104 includes application programming interface (API) server 302, a state database 303, a scheduler 304, a scheduler extender 306, controllers 308, and plugins 319. API server 302 includes the Kubernetes API server, kube-api-server ("Kubernetes API 326") and custom APIs 305. Custom APIs 305 are API extensions of Kubernetes API 326 using either the custom resource/operator extension pattern or the API extension server pattern. Custom APIs 305 are used to create and manage custom resources, such as VM objects and network interface (NIF) objects. API server 302 provides a declarative schema for creating, updating, deleting, and viewing objects.

State database 303 stores the state of supervisor cluster 101 (e.g., etcd) as objects created by API server 302. A user can provide application specification data to API server 302 that defines various objects supported by the API (e.g., as a YAML document). The objects have specifications that represent the desired state. State database 303 stores the objects defined by application specification data as part of the supervisor cluster state. Standard Kubernetes objects ("Kubernetes objects 310") include namespaces 320, nodes 322, and pods 324 among others. Custom objects 307 are resources defined through custom APIs 305 (e.g., VM objects and NIF objects). Namespaces 320 provide scope for objects. Namespaces are objects themselves maintained in state database 303. A namespace can include resource quotas, limit ranges, role bindings, and the like that are applied to objects declared within its scope. VI control plane 113 creates and manages supervisor namespaces for supervisor cluster 101. A supervisor namespace is a resource-constrained and authorization-constrained unit of multi-tenancy managed by virtualization management server 116. Namespaces 320 inherit constraints from corresponding supervisor cluster namespaces.

Controllers 308 can include, for example, standard Kubernetes controllers ("Kubernetes controllers 316") (e.g., kube-controller-manager controllers, cloud-controller-manager controllers, etc.) and custom controllers 318. Custom controllers 318 include controllers for managing lifecycle of Kubernetes objects 310 and custom objects 307. For example, custom controllers 318 can include a VM controller 328 configured to manage custom VM objects and a pod VM lifecycle controller (PLC) 330 configured to manage pods 324. A controller 308 tracks objects in state database 303 of at least one resource type. Controller(s) 308 are responsible for making the current state of supervisor cluster 101 come closer to the desired state as stored in state database 303. A controller 308 can carry out action(s) by itself, send messages to API server 302 to have side effects, and/or interact with external systems.

Plugins 319 can include, for example, network plugin 312 and storage plugin 314. Plugins 319 provide a well-defined interface to replace a set of functionality of the Kubernetes control plane. Network plugin 312 is responsible for configuration of SD network layer 175 to deploy and configure the cluster network. Network plugin 312 cooperates with virtualization management server 116 and/or network manager 112 to deploy logical network services of the cluster network. Network plugin 312 also monitors state database for custom objects 307, such as NIF objects. Storage plugin 314 is responsible for providing a standardized interface for persistent storage lifecycle and management to satisfy the needs of resources requiring persistent storage. Storage plugin 314 cooperates with virtualization management server 116 and/or persistent storage manager 110 to implement the appropriate persistent storage volumes in shared storage 170.

Scheduler 304 watches state database 303 for newly created pods with no assigned node. A pod is an object supported by API server 302 that is a group of one or more containers, with network and storage, and a specification on how to execute. Scheduler 304 selects candidate nodes in supervisor cluster 101 for pods. Scheduler 304 cooperates with scheduler extender 306, which interfaces with virtualization management server 116. Scheduler extender 306 cooperates with virtualization management server 116 (e.g., such as with DRS) to select nodes from candidate sets of nodes and provide identities of hosts 120 corresponding to the selected nodes. For each pod, scheduler 304 also converts the pod specification to a pod VM specification, and scheduler extender 306 asks virtualization management server 116 to reserve a pod VM on the selected host 120. Scheduler 304 updates pods in state database 303 with host identifiers.

Kubernetes API 326, state database 303, scheduler 304, and Kubernetes controllers 316 comprise standard components of a Kubernetes system executing on supervisor cluster 101. Custom controllers 318, plugins 319, and scheduler extender 306 comprise custom components of orchestration control plane 115 that integrate the Kubernetes system with host cluster 118 and VI control plane 113.

In embodiments, API server 302, state database 303, scheduler 304, controllers 308, and plugins 319 execute in containers supported by a container engine 350 (e.g., Docker) and a guest OS 354 (e.g., Linux). Supervisor Kubernetes master 104 also includes a sync service 352 executing on guest OS 354. Sync service 342 functions to perform various configurations of guest OS 354 and/or container engine 350 to support API server 302, state database 303, scheduler 304, controllers 308, and plugins 319. In embodiments, sync service 352 performs configuration of routing rules 358 for a network stack 356 of guest OS 354, as described further herein. In other embodiments, one or more of API server 302, state database 303, scheduler 304, controllers 308, and plugins 319 can execute as services directly on guest OS 354, rather than in containers. In some embodiments, container engine 350 is omitted entirely and all components execute as services on guest OS 354. In some embodiments, one or more of API server 302, state database 303, scheduler 304, controllers 308, and plugins 319 can execute as a container is a separate pod VM 130. In general, supervisor Kubernetes master 104 can be implemented using one or more native VMs 140 and/or one or more pod VMs 130.

Figure 4:
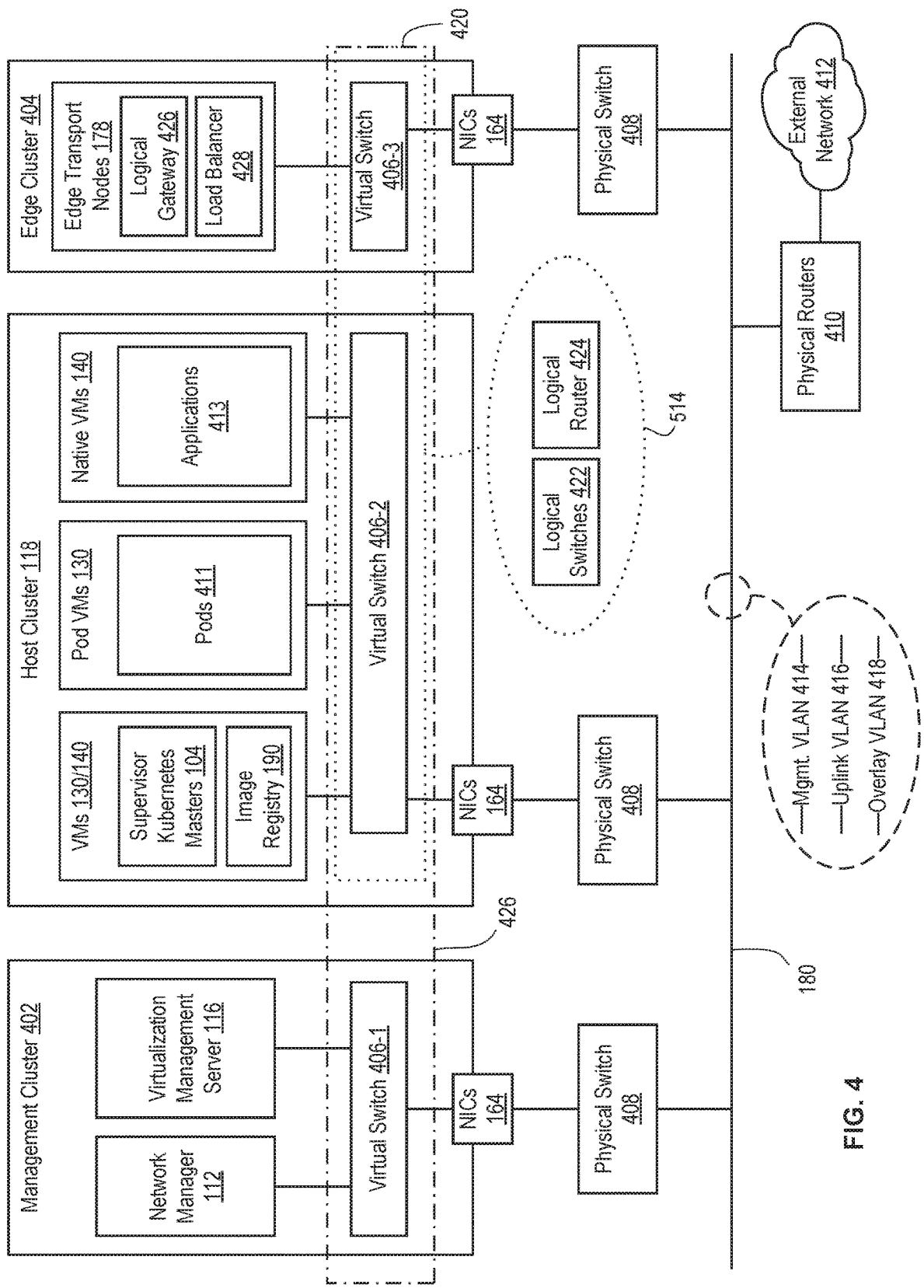
FIG. 4 is a block diagram depicting an infrastructure view of an SD network layer in a virtualized computing system according to an embodiment.

FIG. 4 is a block diagram depicting an infrastructure view of an SD network layer in a virtualized computing system according to an embodiment. In the example shown, virtualized computing system 100 includes host cluster 118 having VMs 130/140 executing therein. Each VM 130/140 includes one or more virtual network interfaces to port(s) on a virtual switch 406-2. Virtual switch 406-2 includes ports coupled to NICs 164. NICs 164 are coupled to physical switches 408 on physical network 180. Physical network 180 includes one or more physical routers 410. Physical routers 410 are coupled between physical network 180 and an external network 412 (e.g., a corporate network or the public Internet).

In an embodiment, network manager 112 and virtualization management server 116 comprise VMs in a management cluster 402. In embodiments, management cluster 402 is a logical cluster implemented within host cluster 118. In other embodiments, management cluster 402 is implemented within another host cluster of virtualized computing system 100. Network manager 112 and virtualization management server 116 have virtual network interfaces coupled to ports on a virtual switch 406-1.

In an embodiment, edge transport nodes 178 form an edge cluster 404. In embodiments, edge cluster 404 is a logical cluster implemented within host cluster 118. In other embodiments, edge cluster 404 is implemented within another host cluster of virtualized computing system 100. Edge transport nodes 178 have virtual network interfaces coupled to ports on a virtual switch 406-3.

Physical network 180 is logically divided into management VLAN 414, uplink VLAN 416, and overlay VLAN 418 using external network virtualization. Management cluster 402, host cluster 118, and edge cluster 404 are configured in a VLAN transport zone associated with the management VLAN 414. VMs 130/140 requiring access to the management network (i.e., management VLAN 414) are coupled to port groups on a distributed switch 427, which are connected to uplinks associated with management VLAN 414. Distributed switch 427 comprises virtual switches 406-1 . . . 406-3. Host cluster 118 and edge cluster 404 are configured in an overlay transport zone associated with overlay VLAN 418. VMs 130/140 requiring access to the overlay network (i.e., overlay VLAN 418) are coupled to port groups on a distributed switch 420, which are connected to uplinks associated with overlay VLAN 418. Distributed switch 420 comprises virtual switches 406-2 and 406-3. Virtual switches 406-1 . . . 406-3 can include separate software components (not shown) associated with the respective VLAN and overlay transport zones. Edge cluster 404 is configured in another VLAN transport zone associated with uplink VLAN 418. Edge transport nodes 178 are coupled to port groups on virtual switch 406-3, which are connected to uplinks associated with uplink VLAN 418. Edge cluster 404 can route traffic to and receive traffic from external network 412 through physical routers 410 and uplink VLAN 418.

Host cluster 118 includes VMs 130/140 implementing supervisor Kubernetes masters 104 and image registry 190. Host cluster 118 includes pod VMs 130 executing pods 411, and native VMs 140 executing applications 413. All VMs 130/140 of host cluster 118 are connected to a cluster network 514 implemented in the overlay transport zone. Cluster network 514 includes logical switches 422 and a logical router 424, as described further below. Logical switches 422 and logical router 424 are implemented by distributed switch 420. Logical segments formed by logical switches 422 are implemented using L2-over-L3 tunnels on overlay VLAN 418 using a protocol, such as VXLAN or Geneve. Logical router 424 provides L3 connectivity among the logical segments. Logical router 424 includes uplinks to logical gateways 426 executing in edge transport nodes 178. Logical router 424 can also include a service router (SR) portion in edge transport nodes 178 that provides stateful services, such as a load balancer 428. Cluster network 514 supports communication between VMs 130/140, as well as ingress/egress through edge transport nodes 178 VMs 130/140 implementing supervisor Kubernetes masters 104 are further connected to the management network for communication with virtualization management server 116 and network manager 112, as discussed further herein.

Figure 5A:
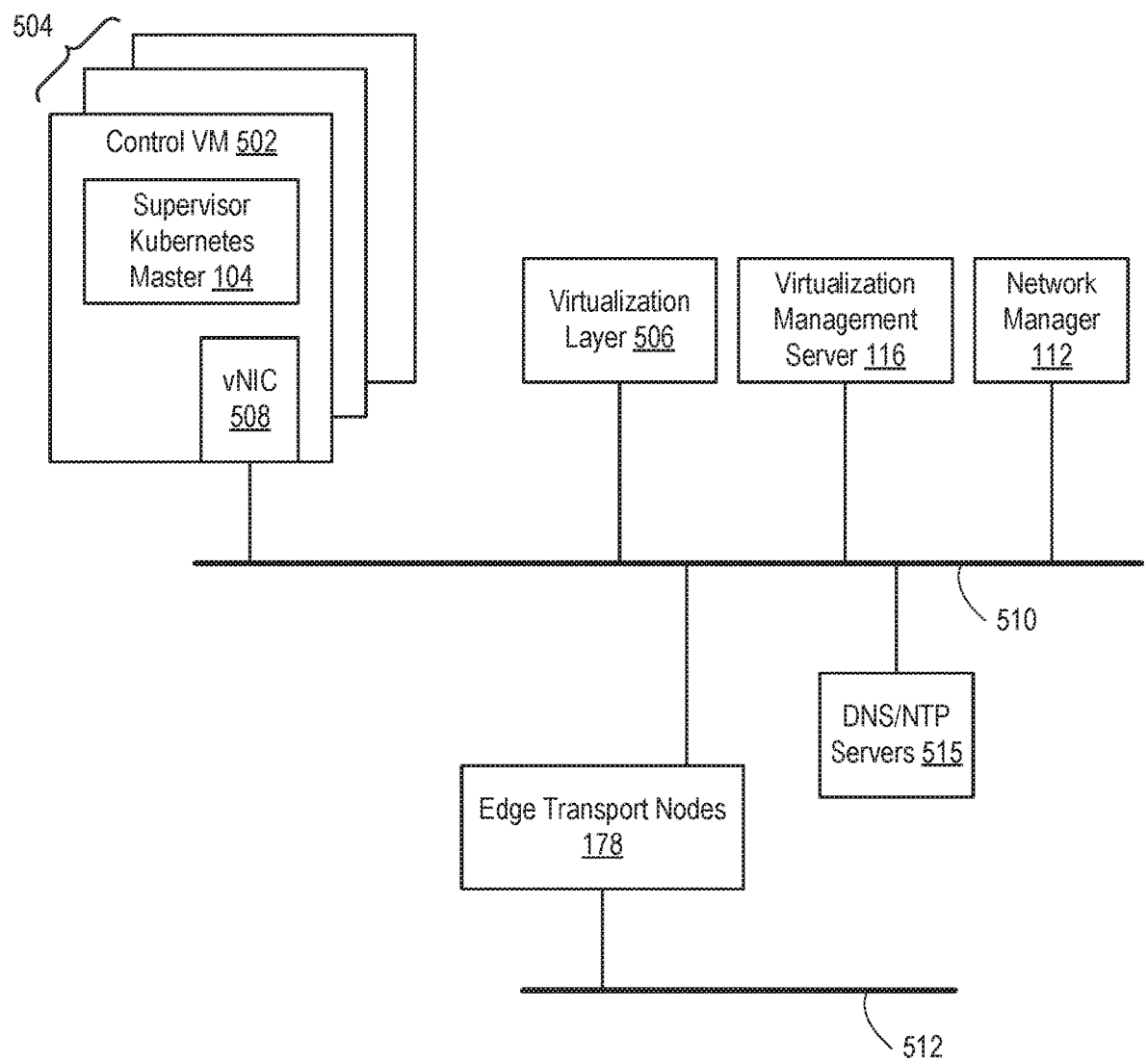
FIG. 5A is a block diagram depicting an initial deployment of an orchestration control plane of a supervisor cluster according to an embodiment.
Figure 5B:
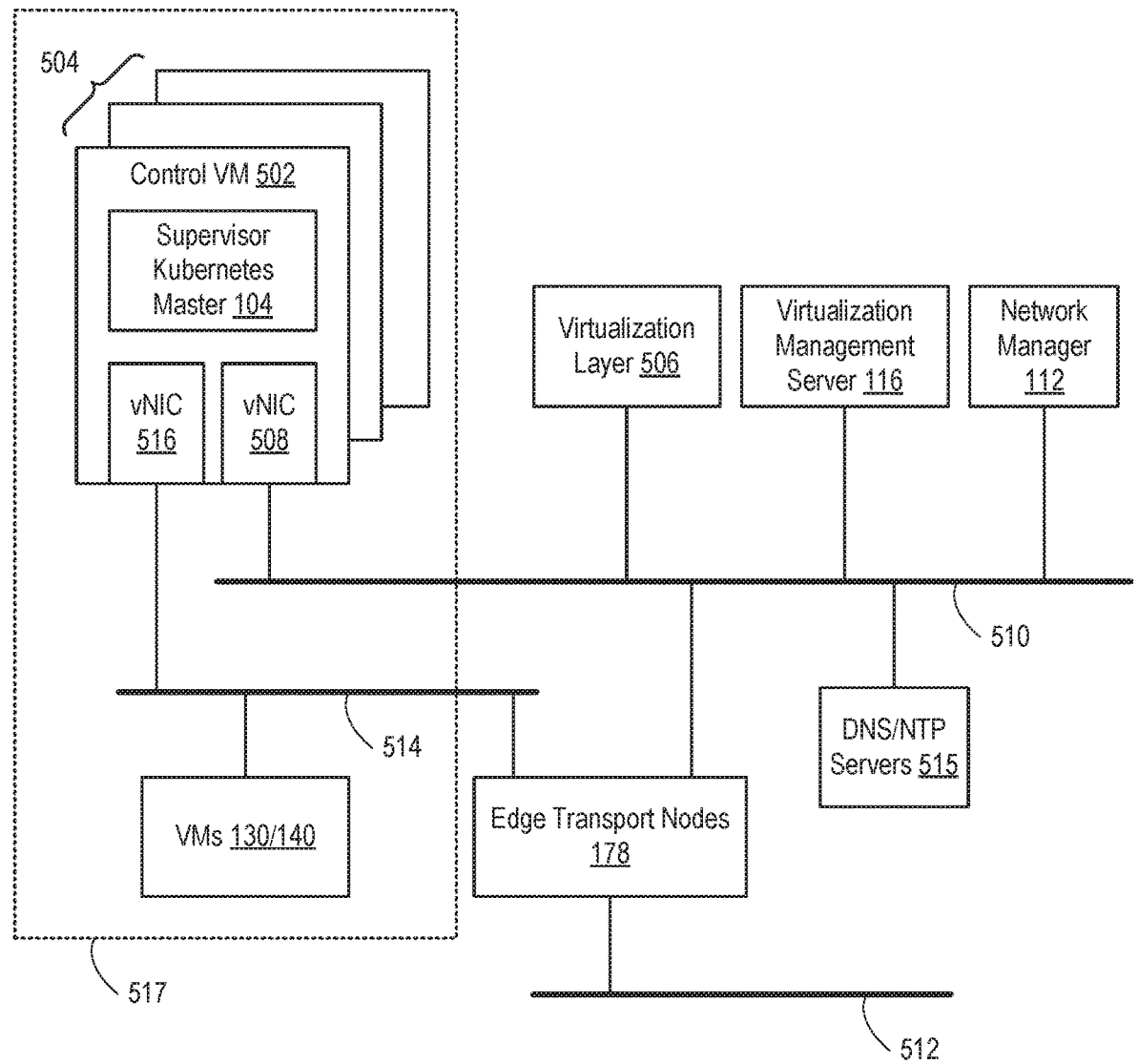
FIG. 5B is a block diagram depicting a configured cluster network in an SD network layer of a supervisor cluster according to an embodiment.
Figure 6:
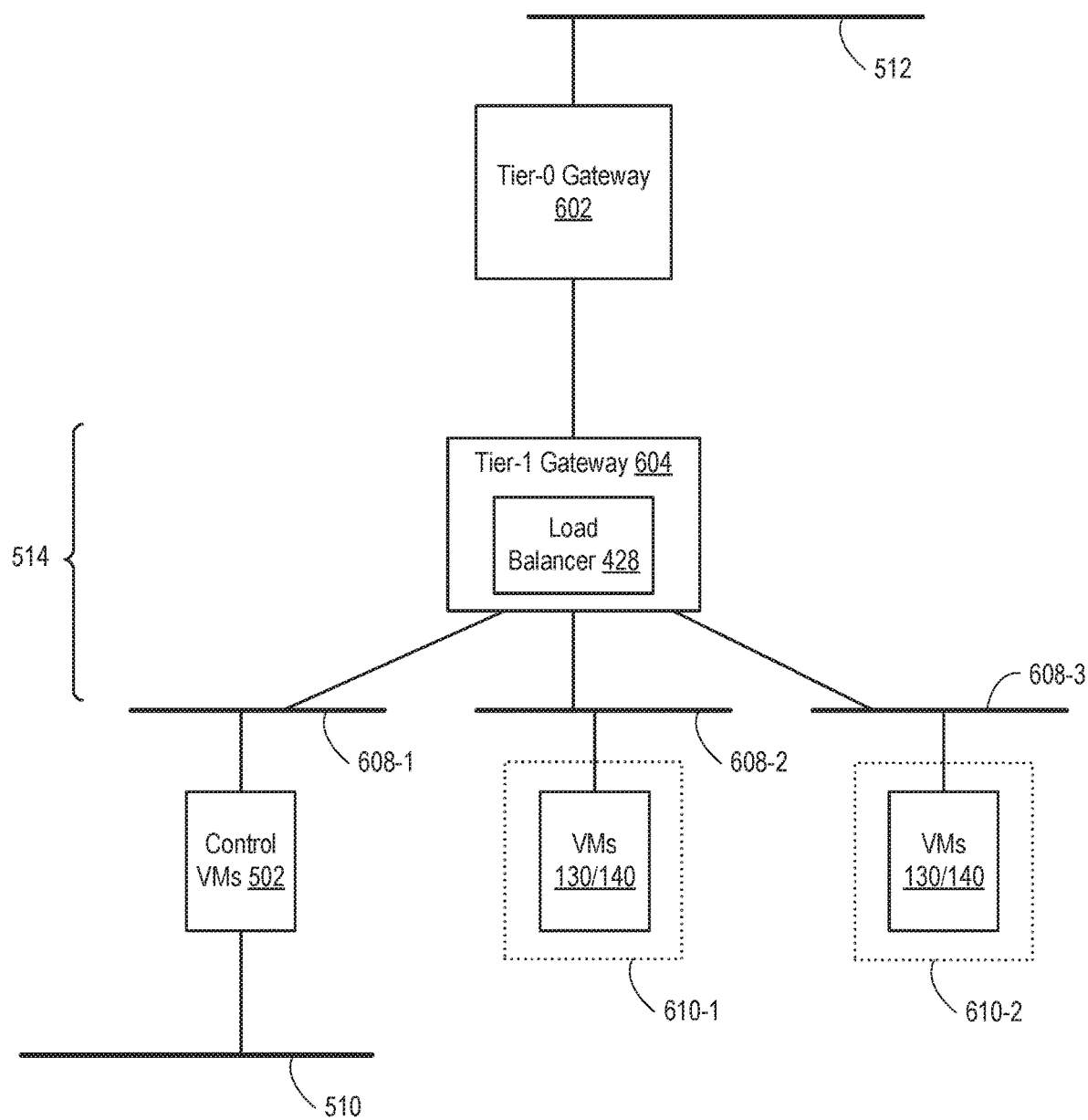
FIG. 6 is a block diagram depicting a logical view of a cluster network according to an embodiment.

FIG. 5A is a block diagram depicting an initial deployment of an orchestration control plane of a supervisor cluster according to an embodiment. FIG. 5B is a block diagram depicting a configured cluster network in an SD network layer of a supervisor cluster according to an embodiment. FIG. 6 is a block diagram depicting a logical view of a cluster network according to an embodiment. FIGS. 5A-5B and FIG. 6 are referenced below with respect to the methods of FIGS. 7 and 8.

Figure 7:
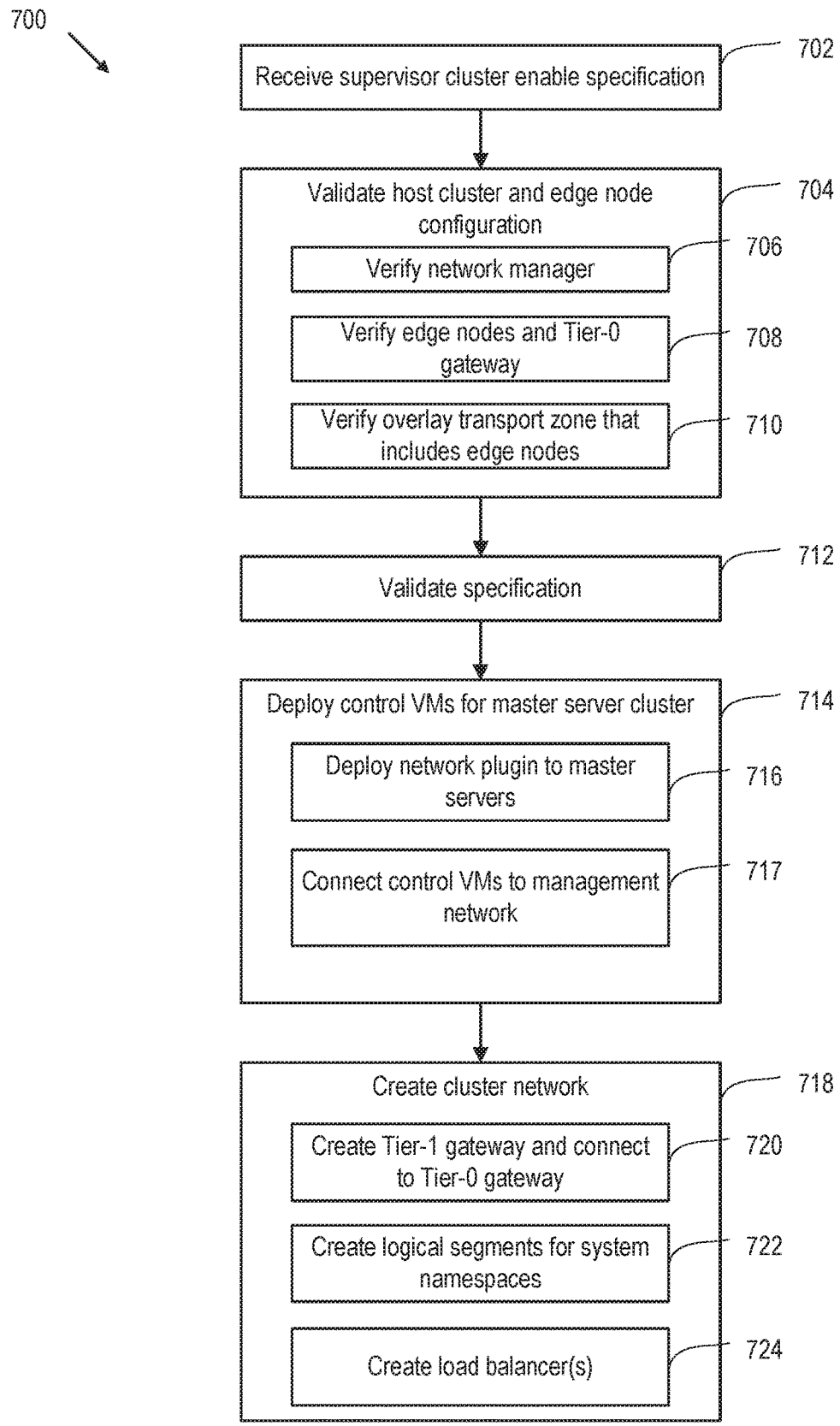
FIG. 7 is a flow diagram depicting a method of initial deployment of an orchestration control plane of a supervisor cluster according to an embodiment.

FIG. 7 is a flow diagram depicting a method 700 of initial deployment of an orchestration control plane of a supervisor cluster according to an embodiment. Method 700 can be performed by virtualization management server 116 and a supervisor Kubernetes master 104 executing on CPU, memory, storage, and network resources managed by a virtualization layer (e.g., a hypervisor) or a host OS.

Method 700 begins at step 702, where a VI admin interacts with virtualization management server 116 to define an enable specification for supervisor cluster 101. In embodiments, the enable specification is a declarative specification for the configuration of supervisor cluster 101, include a network configuration thereof, and supervisor cluster service 109 functions to bring the state of host cluster 118 and SD network layer 175 to the desired state. The Enable specification can include various declarations, including declarations for network configurations. The network configurations can include, for example, specification of VLAN segments, Internet Protocol (IP) pools for pods, IP pools for ingress, IP pools for egress, distributed switch identifier or overlay transport zone identifier, edge cluster identifier, and the like.

At step 704, supervisor cluster service 109 validates host cluster 118 and edge transport node 178 configuration. In embodiments, at step 706, supervisor cluster server 109 verifies network manager 112 is property configured and deployed. At step 708, supervisor cluster service 109 verifies that edge transport nodes 178 are configured to handle North/South traffic for host cluster 118 through a Tier-0 gateway. At step 710, supervisor cluster service 109 verifies that the overlay transport zone has been deployed spanning host cluster 118 and at least one of edge transport nodes 178. At step 712, supervisor cluster service 109 validates the enable specification. For example, supervisor cluster service 109 can verify that there are no overlaps between inputs (e.g., VLANs, IP pools, etc.).

At step 714, supervisor cluster service 109 cooperates with VI service(s) 108 to deploy control VMs 502. Each control VM 502 executes a supervisor Kubernetes master 104. A cluster 504 of control VMs 502 implements a cluster of master servers. In embodiments, each control VM 502 is deployed to a different host 120 using anti-affinity rules. In embodiments, at step 716, supervisor cluster service 109 deploys network plugins 312 to each supervisor Kubernetes master 104. Alternatively, network plugins 312 can be part of the VM image used to spin up control VMs 502. At step 717, network plugins connect control VMs 502 to the management network.

The state of initial deployment of orchestration control plane 115 through step 717 is shown in FIG. 5A. As shown, each control VM 502 executes supervisor Kubernetes master 104 and includes a virtual network interface card (vNIC) 508 connected to a management network 510. Virtualization management server 116 and network manager 112 are connected to management network 510. Likewise, components executing in virtualization layer 506 of host cluster 118 are connected to management network 510 (e.g., pod VM controller 216). Virtualization management server 116 and network manager 112 do not have to be on the same IP subnetwork as control VMs 502. Domain name service (DNS) and network time protocol (NTP) servers 515 can be connected to management network 510 to provide respective DNS and NTP services. Edge transport nodes 178 also include a virtual network interface connected to management network 510. Edge transport nodes 178 include a further virtual network interface connected to an uplink network 512. In the example of FIG. 4, management network 510 is implemented using management VLAN 414 and uplink network 512 is implemented using uplink VLAN 416.

Returning to FIG. 7, at step 718, a network plugin 312 creates cluster network 514 for the Kubernetes system. In embodiments, at step 720, network plugin 312 creates a tier-1 gateway (e.g., a Tier-1 logical router) having an uplink connected to the Tier-0 gateways in edge transport nodes 178. At step 722, network plugin 312 creates logical segments (e.g., deploys logical switches) for each system namespace defined by supervisor Kubernetes masters 104. At step 724, network plugin 312 deploys one or more load balancers in edge transport nodes 178.

The state of cluster network after step 718 is shown in FIG. 6. As shown, a tier-1 gateway 604 has an uplink port connected to a tier-0 gateway 602. Tier-0 gateway 602 has an uplink connected to uplink network 512. Tier-0 gateway 602 is implemented by a logical gateway 426 in edge transport nodes 178. A pair of edge transport nodes 178 can provide an active-passive pair of logical gateways 426 to implement Tier-0 gateway 602. Tier-1 gateway 604 is implemented using a logical router 424, which includes both a distributed router (software in distributed switch 420) and a service router executing in edge transport nodes 178. The service router portion of Tier-1 gateway 604 provides load balancer 428. Tier-1 gateway 604 is connected to logical segments 608-1 . . . 608-3 implemented by logical switches 422. Together, logical segments 608 and tier-1 gateway 604 comprise cluster network 514. VMs 130/140 are connected to logical segment 608-2, which corresponds to a namespace 610-1. VMs 130/140 are connected to a logical segment 608-3, which corresponds to a namespace 610-2. By way of example, two namespaces 610 are shown, but in general cluster network 514 can include logical segment(s) for one or more namespaces. At the end of method 700, control VMs 502 are not yet connected to cluster network 514. Rather, control VMs 502 are only connected to management network 510.

Figure 8:
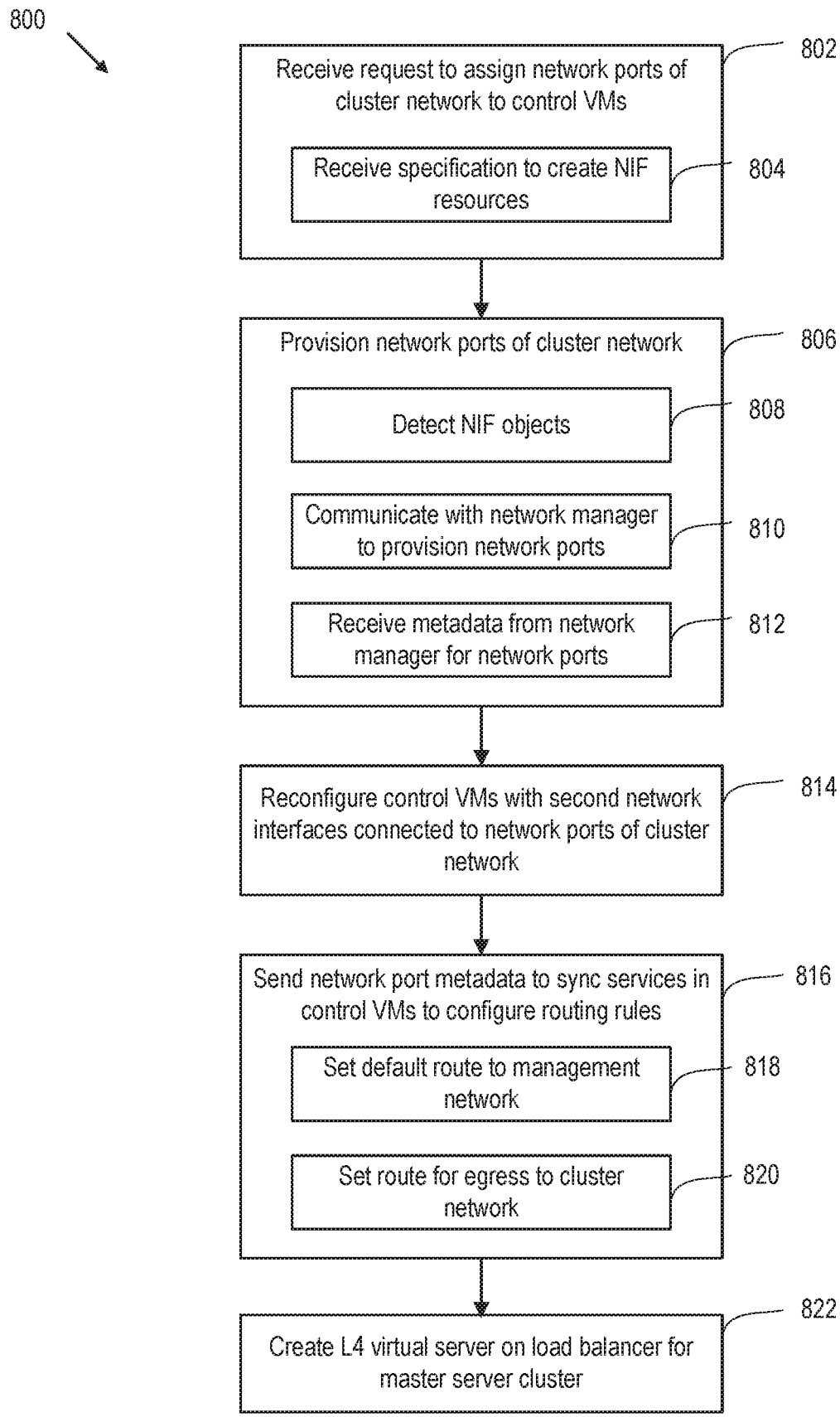
FIG. 8 is a flow diagram depicting a method of configuring a cluster network for an application management system according to an embodiment.

FIG. 8 is a flow diagram depicting a method 800 of configuring a cluster network for an application management system according to an embodiment. Method 800 can be performed by a supervisor Kubernetes master 104 executing on CPU, memory, storage, and network resources managed by a virtualization layer (e.g., a hypervisor).

Method 800 begins at step 802, where supervisor Kubernetes master 104 receives a request to assign network ports of cluster network 514 to control VMs 502. For example, supervisor cluster service 109 can provide a specification to supervisor Kubernetes master 104 through API server 302 to define NIF objects 325 for control VMs 502 (804). At step 806, network plugin 312 in supervisor Kubernetes master 104 provisions network ports of cluster network 514. For example, at step 808, network plugin 312 detects NIF objects 325. At step 810, network plugin 312 cooperates with network manager 112 over management network 510 to provision the network ports. At step 812, network plugin 312 receives metadata from network manager 112 for the network ports.

At step 814, supervisor Kubernetes master 104 cooperates with virtualization manager 116 to reconfigure control VMs 502 with second network interfaces connected to the newly provisioned network ports of cluster network 514. For example, network plugin 312 can modify state of custom objects 307 associated with control VMs 502. VM controller 328 notices the change in state and cooperates with virtualization management server 116 to add the second network interfaces to control VMs 502.

As shown in FIG. 5B, a vNIC 516 is added to each control VM 502. In embodiments, virtualization management server 116 "hot adds" vNIC 516 to each control VM 502, which does not require a shutdown or restart of control VMs 502. The vNIC 516 is coupled to a newly provisioned network port on cluster network 514. Thus, control VMs 502 are connected to cluster network 514 along with other VMs 130/140 deployed in the system namespaces. This allows control VMs 502 to have ingress/egress access to external networks through edge transport nodes 178. Together, VMs 130/140 and control VMs 502 comprise a cluster of VMs managed by the Kubernetes system. As shown in FIG. 6, network manager 112 provides a logical segment 608-1 using a logical switch 422. The vNIC 516 of each control VM 502 is coupled to a port of a logical switch 422 implementing logical segment 608-1. Ingress/egress access for control VMs 502 is then through tier-1 gateway 604 and tier-0 gateway 602. Load balancer 428 provides load balancing services for cluster 504 of supervisor Kubernetes masters 104.

Returning to FIG. 8, at step 816, network plugin 312 sends network port metadata to sync service 352 executing in each control VM 502 to configure routing rules 358. In embodiments, at step 818, the network port metadata is used by sync service 352 to self-configure network stack 356 to set a default route to management network 510. That is, traffic by default is routed to management network 510. At step 820, the network port metadata is used by sync service 352 to self-configure network stack 356 to set a route for egress traffic to cluster network 514. Thus, all traffic other than ingress/egress traffic is routed to management network 510, while egress traffic is routed to cluster network 514 in order to reach an external network through edge transport nodes 178. At step 822, network plugin 312 creates a L4 virtual server on load balancer 428 for cluster 504 of supervisor Kubernetes masters 104. The L4 virtual server provides an ingress point for the external network to reach cluster 504, and load balancer 428 balances ingress traffic among cluster 504 of supervisor Kubernetes masters 104.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of configuring a cluster network for an application management system having virtual machines (VMs) executing on a virtualization layer in a cluster of hosts connected to a physical network, wherein the application management system is integrated with the virtualization layer and the VMs include first VMs in each of which one or more containers of an application managed by the application management system are to be executed, the method comprising:
   receiving, at a first master server, a request to assign network ports of the cluster network, to which the first VMs are connected, to second VMs of the VMs, the second VMs implementing a control plane of the application management system through which containers of the application are deployed for execution in the first VMs, the control plane of the application management system including the first master server, and the second VMs having first network interfaces connected to a management network isolated from the cluster network;
   provisioning, by cooperation of the first master server with a network manager connected to the management network, the network ports of the cluster network; and
   reconfiguring, by cooperation of the first master server with a virtualization management server connected to the management network, the second VMs with second network interfaces connected to the network ports of the cluster network.

2. The method of claim 1, further comprising:
   receiving, at the first master server from the network manager, metadata associated with the network ports; and
   sending, from the first master server to services executing on the second VMs, the metadata for self-configuration of routing rules in the second VMs to route first traffic to the management network and second traffic to the cluster network.

3. The method of claim 1, wherein the step of receiving the request to assign the network ports comprises:
   receiving a specification at the first master server that specifies creation of resources through an application programming interface (API) server of the first master server, the resources monitored by a network plugin executing in the first master server.

4. The method of claim 3, wherein the step of provisioning is performed by the network plugin in cooperation with the network manager.

5. The method of claim 1, wherein the cluster network comprises a first logical router and a first logical switch provisioned in a software-defined (SD) network layer of the cluster of hosts, the SD network layer managed by the network manager, the first logical switch connected to the first logical router and including the network ports.

6. The method of claim 5, wherein the SD network layer extends into an edge node, the edge node including a second router coupled between the first logical router and a physical network.

7. The method of claim 5, wherein the first master server manages a namespace for declared objects, and wherein the cluster network includes a second logical switch provisioned in the SD network layer, the second logical switch connected to the first logical router and to at least one of the VMs other than the second VMs.

8. A non-transitory computer readable medium comprising instructions to be executed in a computing device to cause the computing device to carry out a method of configuring a cluster network for an application management system having virtual machines (VMs) executing on a virtualization layer in a cluster of hosts connected to a physical network, wherein the application management system is integrated with the virtualization layer and the VMs include first VMs in each of which one or more containers of an application managed by the application management system are to be executed, the method comprising:
   receiving, at a first master server, a request to assign network ports of the cluster network, to which the first VMs are connected, to second VMs of the VMs, the second VMs implementing a control plane of the application management system through which containers of the application are deployed for execution in the first VMs, the control plane of the application management system including the first master server, and the second VMs having first network interfaces connected to a management network isolated from the cluster network;
   provisioning, by cooperation of the first master server with a network manager connected to the management network, the network ports of the cluster network; and
   reconfiguring, by cooperation of the first master server with a virtualization management server connected to the management network, the second VMs with second network interfaces connected to the network ports of the cluster network.

9. The non-transitory computer readable medium of claim 8, said method further comprising:
   receiving, at the first master server from the network manager, metadata associated with the network ports; and
   sending, from the first master server to services executing on the second VMs, the metadata for self-configuration of routing rules in the second VMs to route first traffic to the management network and second traffic to the cluster network.

10. The non-transitory computer readable medium of claim 8, wherein the step of receiving the request to assign the network ports comprises:
   receiving a specification at the first master server that specifies creation of resources through an application programming interface (API) server of the first master server, the resources monitored by a network plugin executing in the first master server.

11. The non-transitory computer readable medium of claim 10, wherein the step of provisioning is performed by the network plugin in cooperation with the network manager.

12. The non-transitory computer readable medium of claim 8, wherein the cluster network comprises a first logical router and a first logical switch provisioned in a software-defined (SD) network layer of the cluster of hosts, the SD network layer managed by the network manager, the first logical switch connected to the first logical router and including the network ports.

13. The non-transitory computer readable medium of claim 12, wherein the SD network layer extends into an edge node, the edge node including a second router coupled between the first logical router and a physical network.

14. The non-transitory computer readable medium of claim 13, wherein the first master server manages a namespace for declared objects, and wherein the cluster network includes a second logical switch provisioned in the SD network layer, the second logical switch connected to the first logical router and to at least one of the VMs other than the second VMs.

15. A virtualized computing system integrated with an application management system, comprising:
   a host cluster of hosts connected by a physical network and executing a virtualization layer on hardware platforms of the hosts, wherein the hardware platform of each host includes a processor and memory, and the virtualization layer is configured to support execution of virtual machines (VMs) and is integrated with the application management system, the VMs including first VMs in each of which one or more containers of an application managed by the application management system are to be executed and second VMs that implement a control plane of the application management system through which containers of the application are deployed for execution in the first VMs; and
   a software-defined (SD) network layer of the host cluster configured to provide a cluster network for the application management system, wherein
   the second VMs have first network interfaces connected to a management network isolated from the cluster network and include a first master server, which is configured to:
      receive a request to assign network ports of the cluster network to the second VMs;
      provision, by cooperation with a network manager connected to the management network, the network ports of the cluster network; and
      reconfigure, by cooperation with a virtualization management server connected to the management network, the second VMs with second network interfaces connected to the network ports of the cluster network.

16. The virtualized computing system of claim 15, wherein the first master server is further configured to:
   receive, from the network manager, metadata associated with the network ports; and
   send, to services executing on the second VMs, the metadata for self-configuration of routing rules in the second VMs to route first traffic to the management network and second traffic to the cluster network.

17. The virtualized computing system of claim 15, wherein the first master server is configured to receive the request to assign the network ports by:
   receiving a specification that specifies creation of resources through an application programming interface (API) server of the first master server, the resources monitored by a network plugin executing in the first master server.

18. The virtualized computing system of claim 17 wherein the first master server is configured to provision the network ports using the network plugin in cooperation with the network manager.

19. The virtualized computing system of claim 15, wherein the cluster network comprises a first logical router and a first logical switch provisioned in the SD network layer, the SD network layer managed by the network manager, the first logical switch connected to the first logical router and including the network ports.

20. The virtualized computing system of claim 19, wherein the SD network layer extends into an edge node, the edge node including a second router coupled between the first logical router and a physical network.

* * * * *